United States Patent
Peana et al.

(10) Patent No.: US 11,250,759 B1
(45) Date of Patent: Feb. 15, 2022

(54) SYSTEMS AND METHODS FOR ADAPTIVE COLOR ACCURACY WITH MULTIPLE SENSORS TO CONTROL A DISPLAY'S WHITE POINT AND TO CALIBRATE THE DISPLAY USING PRE-BOOT DIAGNOSTICS

(71) Applicant: Dell Products, L.P., Round Rock, TX (US)

(72) Inventors: Stefan Peana, Austin, TX (US); Karun Palicherla Reddy, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/984,433

(22) Filed: Aug. 4, 2020

(51) Int. Cl.
| | | |
|---|---|---|
| *G09G 3/20* | (2006.01) | |
| *G09G 5/02* | (2006.01) | |
| *G09G 5/06* | (2006.01) | |
| *G09G 3/3208* | (2016.01) | |
| *G06F 3/02* | (2006.01) | |
| *G06F 1/16* | (2006.01) | |

(52) U.S. Cl.
CPC ......... *G09G 3/2003* (2013.01); *G06F 3/0227* (2013.01); *G09G 3/3208* (2013.01); *G09G 5/02* (2013.01); *G09G 5/06* (2013.01); *G06F 1/1616* (2013.01); *G09G 2320/0242* (2013.01); *G09G 2320/0285* (2013.01); *G09G 2320/0626* (2013.01); *G09G 2320/0666* (2013.01); *G09G 2320/0693* (2013.01); *G09G 2360/144* (2013.01)

(58) Field of Classification Search
CPC ..... G09G 2360/144; G09G 2320/0666; G09G 2320/0626; G09G 2320/0693; G09G 2320/0233; G09G 2320/02; G09G 2320/0242; G09G 2320/0285; G09G 2320/08; G09G 5/02; G09G 5/06; G09G 5/10; G09G 2340/06; G09G 3/2003; G09G 3/20
See application file for complete search history.

(56) References Cited

U.S. PATENT DOCUMENTS

| | | | | |
|---|---|---|---|---|
| 7,351,947 | B2 * | 4/2008 | Dailey | H05B 47/11 250/2 UAL |
| 8,130,235 | B2 * | 3/2012 | Marcinkiewicz | H04N 1/6088 345/590 |
| 9,129,548 | B2 * | 9/2015 | Zheng | G01J 1/4228 |
| 9,530,342 | B2 * | 12/2016 | Bell | G09G 3/2096 |
| 9,778,102 | B2 * | 10/2017 | Pang | G01J 1/1626 |
| 10,204,592 | B1 * | 2/2019 | Trim | H04N 1/6075 |
| 10,217,439 | B2 * | 2/2019 | Bonnier | G06F 3/038 |

(Continued)

*Primary Examiner* — Dismery Mercedes
(74) *Attorney, Agent, or Firm* — Fogarty LLP

(57) ABSTRACT

Systems and methods for adaptive color accuracy with multiple sensors to control a display's white point and to calibrate the display using pre-boot diagnostics are described. In some embodiments, an Information Handling System (IHS) may include a processor and a memory coupled to the processor, the memory having program instructions stored thereon that, upon execution, cause the IHS to: receive a first measurement from a first Ambient Light Sensor (ALS) disposed on a display portion of the IHS; receive a second measurement from a second ALS, wherein the second ALS is configured to face the display portion in response to IHS being in a closed posture; and control a brightness of a display based upon at least one of the first or second measurements.

17 Claims, 6 Drawing Sheets

(56) References Cited

U.S. PATENT DOCUMENTS

| | | | |
|---|---|---|---|
| 2006/0073844 A1* | 4/2006 | Chan | H04M 1/0245 |
| | | | 455/550.1 |
| 2007/0272831 A1* | 11/2007 | Dailey | H05B 47/11 |
| | | | 250/2 UAL |
| 2009/0160878 A1* | 6/2009 | Kwong | G09G 5/02 |
| | | | 345/690 |
| 2012/0050307 A1* | 3/2012 | Mahowald | G09G 3/3413 |
| | | | 345/590 |
| 2013/0222408 A1* | 8/2013 | Lee | G09G 5/02 |
| | | | 345/589 |
| 2013/0271437 A1* | 10/2013 | Webster | G09G 3/3466 |
| | | | 345/207 |
| 2017/0103728 A1* | 4/2017 | Chen | G09G 3/2003 |

\* cited by examiner

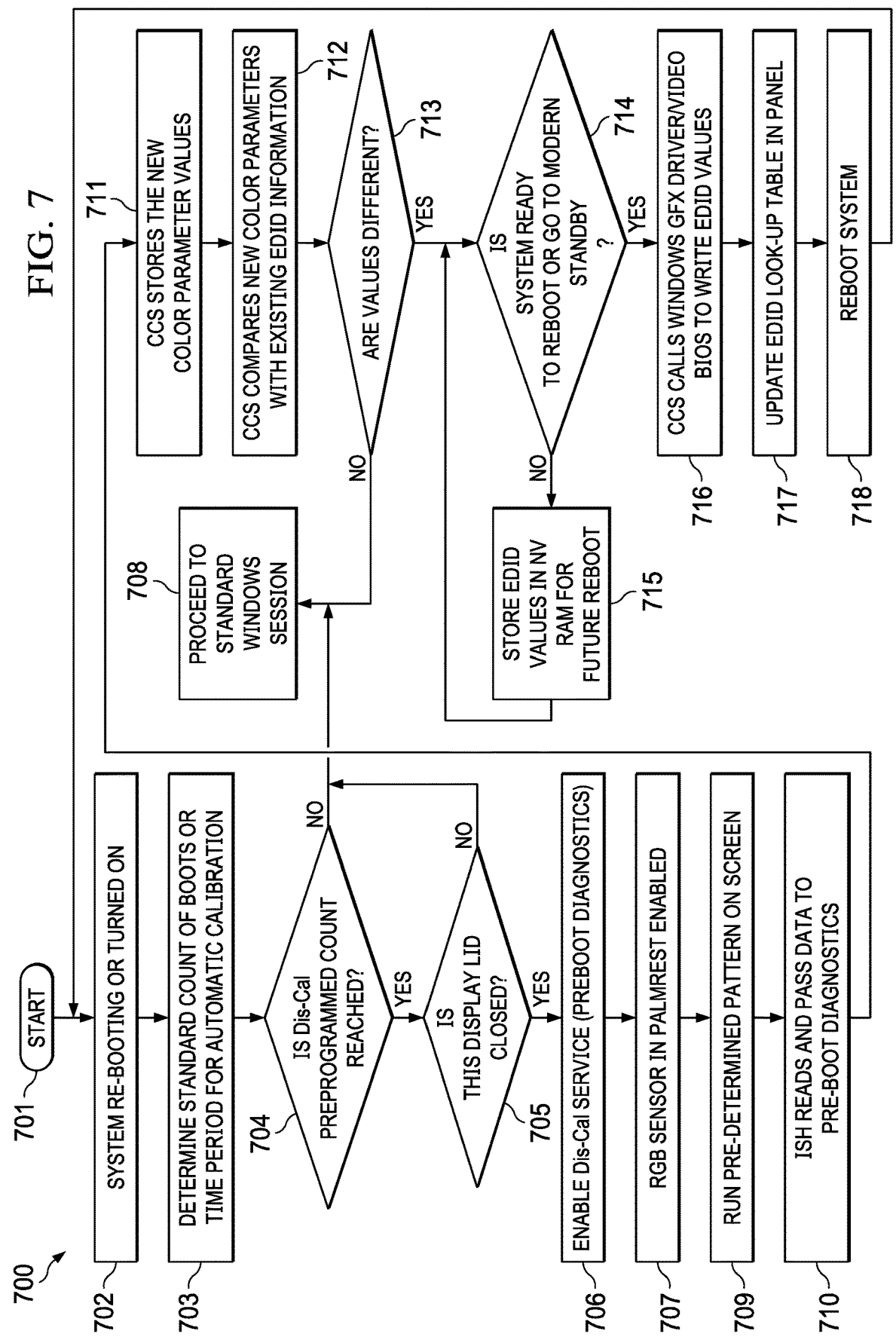

SYSTEMS AND METHODS FOR ADAPTIVE COLOR ACCURACY WITH MULTIPLE SENSORS TO CONTROL A DISPLAY'S WHITE POINT AND TO CALIBRATE THE DISPLAY USING PRE-BOOT DIAGNOSTICS

FIELD

The present disclosure relates generally to Information Handling Systems (IHSs), and more particularly, to systems and methods for adaptive color accuracy with multiple sensors to control a display's white point and to calibrate the display using pre-boot diagnostics.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Users typically interface with an IHS using an electronic display, screen, or monitor (e.g., a Liquid Crystal Display or "LCD" display). A typical problem with such displays is the need to provide a clear picture in different ambient light conditions. To address this, an Ambient Light Sensors (ALS) may be used to collect information about the ambient light level surrounding the display. The light level may then be used to automatically adjust the display's brightness (e.g., via its backlight) thus providing a proper brightness level for clear viewing, conserving power, and/or avoiding end-user frustration.

As the inventors hereof have determined, however, use of a single ALS sensor has its own problems, such as when the IHS in the presence of "directed spot" illumination sources and occlusion caused by shadows. To address these, and other issues, the inventors hereof have developed systems and methods for providing adaptive color accuracy with two or more ALS sensors that are suitable to control a display's white point and to calibrate the display using pre-boot diagnostics.

SUMMARY

Embodiments of methods for adaptive color accuracy with multiple sensors to control a display's white point and to calibrate the display using pre-boot diagnostics are described. In an illustrative, non-limiting embodiment, an Information Handling System (IHS) may include a processor and a memory coupled to the processor, the memory having program instructions stored thereon that, upon execution, cause the IHS to: receive a first measurement from a first Ambient Light Sensor (ALS) disposed on a display portion of the IHS; receive a second measurement from a second ALS, wherein the second ALS is configured to face the display portion in response to IHS being in a closed posture; and control a brightness of a display based upon at least one of the first or second measurements.

In some cases, the display portion may include an Organic Light-Emitting Diode (OLED) panel. The second ALS may be disposed on a palmrest of the IHS. Additionally, or alternatively, the second ALS may be disposed on a keyboard of the IHS. At least one of the first or second ALSs may include an XYZ or RGB color sensor.

To control the brightness of the display, the program instructions, upon execution, may cause the IHS to: select one of the first or second ALS sensors as the sensor that presents least variation in measurements; calculate a correction factor for the selected IHS based upon context information; and use a reading from the selected ALS sensor to control the brightness of the display. The context information may include at least one: of an identity of a user, a user's proximity to the IHS, an identity of an application currently under execution, a duration of execution of the application, a user's gaze direction, or a current IHS posture. Additionally, or alternatively, the context information may include an angle of a hinge coupling two portions of the IHS.

The program instructions upon execution, may further cause the IHS to: determine that the IHS is in the closed posture; render a pre-determined image pattern on the display; and obtain the second measurement in response to the rendering. The program instructions, upon execution, further cause the IHS to: update a lookup table (LUT) of color correction values based upon the second measurement; and use the LUT to render a subsequent image on the display upon reboot of the IHS.

In another illustrative, non-limiting embodiment, a memory storage device having program instructions stored thereon that, upon execution by one or more processors of an IHS, cause the IHS to: receive a first measurement from a first ALS disposed on a display portion of the IHS; receive a second measurement from a second ALS, wherein the second ALS is configured to face the display portion in response to IHS being in a closed posture; and control a brightness of a display based upon at least one of the first or second measurements.

In yet another illustrative, non-limiting embodiment, a method may include receiving a first measurement from a first ALS disposed on a display portion of the IHS; receiving a second measurement from a second ALS, wherein the second ALS is configured to face the display portion in response to IHS being in a closed posture; and controlling a brightness of a display based upon at least one of the first or second measurements.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 7 is a diagram illustrating an example of a method configured to use two or more RGB sensors to correct the white point of a display, according to some embodiments.

DETAILED DESCRIPTION

Figure 1:
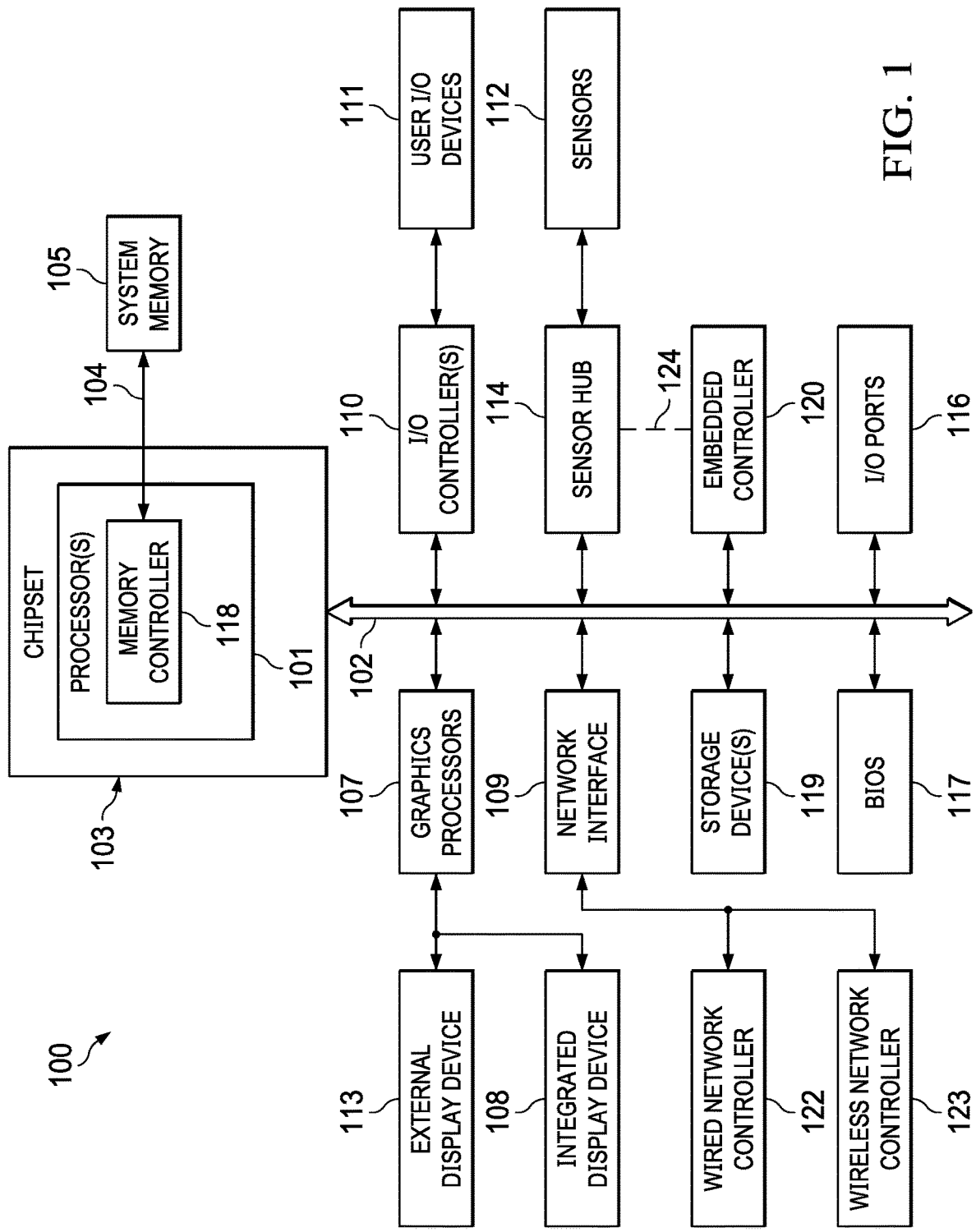
FIG. 1 is a diagram of an example of an Information Handling System (IHS) configured to perform adaptive color accuracy with multiple sensors to control a display's white point and to calibrate the display using pre-boot diagnostics, according to some embodiments.

Systems and methods are described for adaptive color accuracy with multiple sensors to control a display's white point and to calibrate the display using pre-boot diagnostics. In various embodiments, these systems and methods may combine readings from more than one Ambient Light Sensor (ALS) to correct "directed spot" illumination sources and occlusion caused by shadows. Multi-color ALSs may also be used for correcting the automatic white balance in Information Handling Systems (IHSs) that feature dual embedded displays (e.g., foldables), or secondary (i.e., external) displays.

As used herein, the term "display" generally refers to an output device that displays information in pictorial form. For example, a display may include a liquid crystal display (LCD) with light-emitting diode (LED) backlighting, an organic light-emitting diode (OLED) display, a plasma display, etc.

Moreover, placement of a second sensor facing a display may enable the correction of a display's white point in pre-boot diagnostics mode. This is especially suitable for Organic Light-Emitting Diode (OLED) display implementations, where the display's white point drifts rapidly over time. By using pre-boot diagnostics with pre-calibrated images, a display's color point may be reset back to the LCD or video Basic Input/Output System (BIOS)/driver subsystem for best 3D look-up table (LUT) correction.

In some implementations, systems and methods described herein may use multiple inputs of two or more XYZ ALS sensors to read the status of an LCD display's white point (or color coordinates) and/or its drift, for example, when enabled automatically upon closing of the IHS's lid (e.g., in the case of a laptop of foldable IHS). For instance, a secondary XYZ ALS may be integrated into the "C-Cover" (e.g., palmrest or keyboard) of an IHS.

The secondary XYZ ALS may act as a second sensor during the normal operation of the IHS, and it may also be used the purpose of display calibration when the IHS's lid is closed. A pre-diagnostic LCD test may be triggered either by the user's manual intervention, or automatically by policy (e.g., again, when the IHS's lid is closed). The pre-diagnostic LCD test may render pattern(s) of different primary colors and derivates on the screen. The secondary XYZ ALS reads the values and stores it in a pre-defined Random-Access Memory (RAM) region or non-volatile RAM (NVRAM).

In some cases, systems and methods described herein may perform an unattended boot into an IHS's Operating System (OS) and run a Color Correction Service (CCS) that generates brightness and/or color values based on raw sensor readings stored from the IHS's display. A new read/write Extended Display Identification Data (EDID) memory region may be provided such that it may be programmed via the Video GFX/Driver/Video BIOS software interface.

As such, these systems and methods described may avoid the need for other color correction applications having to re-correct the display's LUT parameters, which can reduce implementation costs. Particularly, several of the elements described herein may be assembled in any suitable combination thus resulting is unique ways of controlling display brightness and color accuracy by: (a) leveraging multiple sensors to capture environmental illumination using different locations, (b) executing mathematical algorithms developed to best analyze data for reading accuracy, (c) leveraging sensory input data and accurately adjusting the display brightness and white color point, (d) using multiple sensors for display color calibration for color accuracy output, (e) implementing mathematical algorithms for data interpolation and 3D LUT updates, (f) implementing methods of communication between 3D LUT, EDID, and the system, and/or (g) implementing methods for updating display EDID file (e.g., color primaries and max brightness).

In various embodiments, systems and methods described herein may enable the dynamic capture of the environmental display color tables and may produce mechanism(s) capable of providing the latest values to the manipulating software via an additional RGB-based ALS that monitors an embedded display for any changes or degradation over time. Additionally, or alternatively, these systems and methods may enable the dynamic reading of display color tables during actual usage, and may provide a mechanism for accurate calibration via a combination of an additional RGB-based ALS that measures the embedded display's color (RGB) and brightness values.

The secondary RGB ALS sensor may be placed in IHS facing up to the display. When the display is closed, as is the case in a clamshell notebook, the sensor is activated to read the embedded display parameters and store is appropriate region of EDID/Display ID flash region. An alternate approach may be to store a new copy of embedded display parameters in non-volatile flash region for modification in a subsequent boot. A color and contrast software engine may reference the new table and modify the 3D look up table appropriately. In addition, the new embedded display brightness range may be programmed backed in the OS for modification of display brightness light curve.

Existing displays currently use a single RGB ALS to adjust the display brightness and the white point. However, a single RGB ALS sensor provides only one reading point of the environment, and if the RGB ALS sensor is obstructed or light sources are present in the RGB ALS line of sight, erroneous readings occur. In contrast, the systems and methods described herein may employ multiple RGB ALS sensors located in different planes such that readings can be averaged to eliminate erroneous data collection.

Because self-calibration uses an RGB ALS sensor dedicated for calibration purposes, and such RGB ALS sensor is already located orthogonal to the RGB ALS used for display brightness control, the implementations described herein may couple or stitch readings from both RGB ALS sensors such that the data input is accurate. Methods are discussed for controlling the display's backlight by using multiple RGB ALS sensors. Also, a new mathematical algorithm is developed to best analyze input data to ensure reading accuracy.

For instance, a process flow for managing the RGB ALS may be as follows: (1) RGB ALS provides readings data at a pre-set interval or when a Graphical Processing Unit (GPU) makes a call; (2) collected data is parsed and processed to eliminate or reduce noise or large swings in illumination level; and then (3) the illumination level is used to adjust the backlight brightness whereas the color data is used to adjust the image white point. In cases where post-processing software is used, the RGB ALS data may be made available for adjusting a display's brightness level and the image white point.

Adjusting image brightness and white point may require processing of each image to ensure appropriate image balance. Each point of image input may be mapped using a 3D LUT that accurately captures a display's performance parameters. The RGB ALS sensor may be used to read the display color over a range of brightness's each time the IHS's hinge is closed. The data collected may be used to update the 3D LUT that provides display calibration hence color accuracy.

In some cases, after a pre-determined amount of time, the IHS may be woken up by the BIOS to run in the diagnostics mode when the IHS is in modern standby or suspend state. In other cases, after a pre-determined amount of time (e.g., in number of days), a service tool or the BIOS may prompt the user to run a color calibration test during a Power-on Self-Test (POST). In both cases, an algorithm may receive multiple RGB ALS input data, calculate optimum data point(s), communicate between RGB ALS sensors displays and the IHS, and update a 3D LUT/EDID file.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is a block diagram illustrating components of IHS 100 configured to perform adaptive color accuracy with multiple sensors to control a display's white point and to calibrate the display using pre-boot diagnostics. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In some implementations, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of processor 101. Chipset 103 provides processor 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and/or 113, coupled to IHS 100.

One or more display devices 108 and/or 113 coupled to IHS 100 may utilize LCD, LED, OLED, or other display technologies. In some cases, two embedded displays (e.g., 108A and 108B) may be coupled to each other via a hinge (e.g., in the case of a foldable, dual-display IHS). Each display device 108 and 113 may be capable of receiving touch inputs such as via a touch controller that may be an embedded component of the display device 108 and/or 113 or graphics processor 107, or it may be a separate component of IHS 100 accessed via bus 102. In some cases, power to graphics processor 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an OS (e.g., WINDOWS, MACOS, iOS, ANDROID, LINUX, etc.) for use by IHS 100.

BIOS 117 provides an abstraction layer that allows the OS to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Certain IHS 100 embodiments may utilize sensor hub (e.g., an Integrated Sensor Hub or "ISH") 114 capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, sensors 112 may include two or more ALS sensors, color sensors, or XYZ sensors. As used herein, the terms "Ambient Light Sensor" and "ALS" refer to sensors configured to provide measurements of ambient light intensity which, in some cases, match the human eye's response to light under a variety of lighting conditions. The terms "color ALS," "color sensor," and "RGB sensor" refer to ALS sensors that provide red, green, and blue light sensing separately for precise color measurements. Meanwhile, the terms "XYZ ALS" and "XYZ sensor" refer to sensors configured to perform tristimulus color sensing using XYZ filters that model the standard response curve of the human eye and that enable accurate color and ALS sensing under varying lighting conditions and behind dark glass.

In some cases, one or more sensors 112 may be part of a keyboard or other input device. Processor 101 may be configured to process information received from sensors 112 through sensor hub 114, and to perform methods for performing real-time monitoring and policy enforcement of active applications and services using contextual information obtained from sensors 112.

For instance, during operation of IHS 100, the user may open, close, flip, swivel, or rotate display 108 to produce different IHS postures. In some cases, processor 101 may be configured to determine a current posture of IHS 100 using sensors 112.

For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

In a laptop posture, a first display surface of a first display 108 may be facing the user at an obtuse angle with respect to a second display surface of a second display 108 or a physical keyboard portion. In a tablet posture, a first display 108 may be at a straight angle with respect to a second display 108 or a physical keyboard portion. And, in a book posture, a first display 108 may have its back resting against the back of a second display 108 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor 101 may process user presence data received by sensors 112 and may determine, for example, whether an IHS's end-user is present or absent. Moreover, in situations where the end-user is present before IHS 100, processor 101 may further determine a distance of the end-user from IHS 100 continuously or at pre-determined time intervals. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor 101 may receive and/or to produce system context information using sensors 112 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit (I²C) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions.

In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments be integrated with other components. For example, in some embodiments, all or a portion of the functionality provided by the illustrated components may instead be provided by components integrated into the one or more processor(s) 101 as an SoC.

Figure 2:
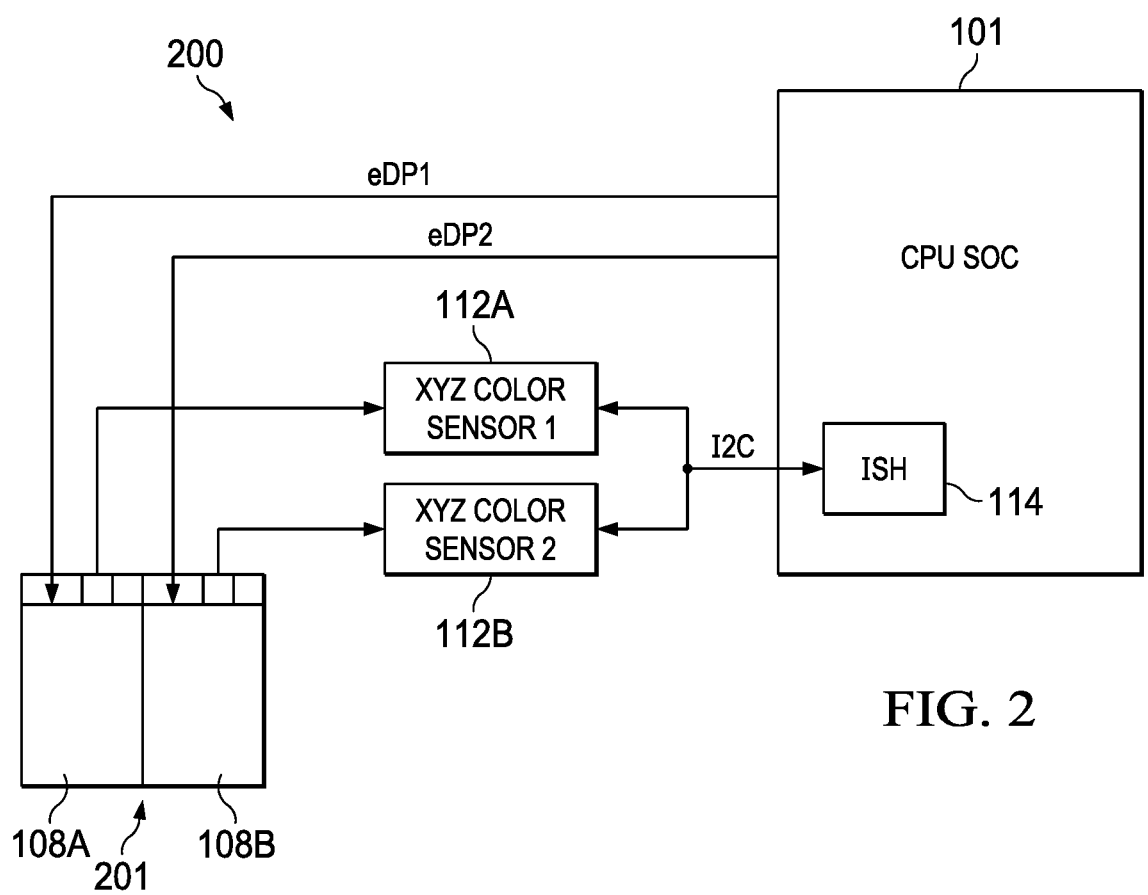
FIG. 2 is a diagram illustrating an example of a hardware system configured to use two or more XYZ sensors to control a brightness of a display, according to some embodiments.

FIG. 2 is a diagram illustrating an example of hardware system 200 configured to use two or more XYZ sensors to control a brightness of a display. Particularly, system 200 includes ISH 114 coupled or integrated into CPU 101 and configured to receive, via an I2C bus, ambient light measurement information from XYZ sensor 112A and XYZ sensor 112B. Each of XYZ sensors 112A and 11B is coupled to a respective one of integrated displays 108A and 108B. Displays 108A and 108B are coupled to each other via hinge 201. In this implementation, displays 108A and 108B may be coupled to CPU 101 via a respective Embedded Display-Port (eDP) bus.

Figure 3:
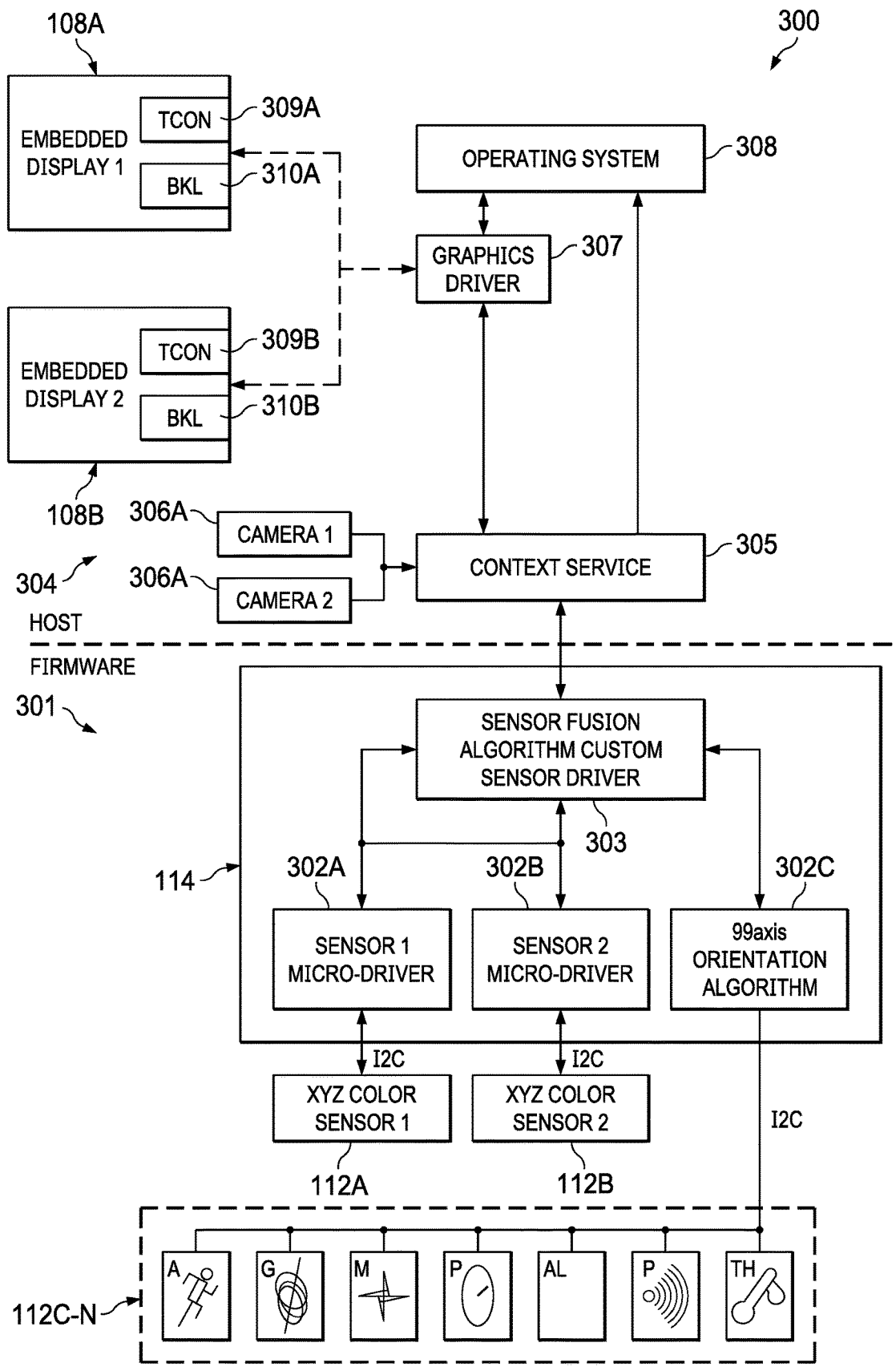
FIG. 3 is a diagram illustrating an example of a software system configured to use two or more XYZ sensors to control a brightness of a display, according to some embodiments.

FIG. 3 is a diagram illustrating an example of a software system 300 configured to use two or more XYZ sensors to control a brightness of a display. In some cases, system 300 may be provided through the execution of program instructions stored in system memory 105 by processor 101 in cooperation with other hardware components of IHS 100, such as graphics processor 107, display(s) 108/113, sensor hub 114 (e.g., configured to perform sensor fusion operations), and sensors 112 (e.g., two or more ALS sensors, a hinge angle sensor, etc.), as also shown in system 200 of FIG. 2.

In FIG. 3, firmware 301 is executed by ISH 114 and OS 305 and context service 305 are executed by host 304 (e.g., processor 101). Firmware 301 provides sensor fusion algorithm or module/custom sensor driver 303 configured to receive sensor data from sensor microdrivers 302A-C, each microdriver configured to receive sensor measurement data from hardware sensors 112A-N, including XYZ sensors 112A and 112B.

Context service 305 receives data from module or driver 303 and from cameras 306A and 306B, for example, to execute method 400 described below. Context service 305 is in communication with OS 308 and with graphics driver 307, such that it may selective pass the results of any method it executes to either or both entities. Graphics driver 307 is in turn coupled to embedded displays 108A and 108B, each display having a respective TCON (timing controller board configured to translate a video signal to specific row and column driver signaling needed by a specific panel) 309A and 309B and backlight 310A and 310B.

Figure 4:
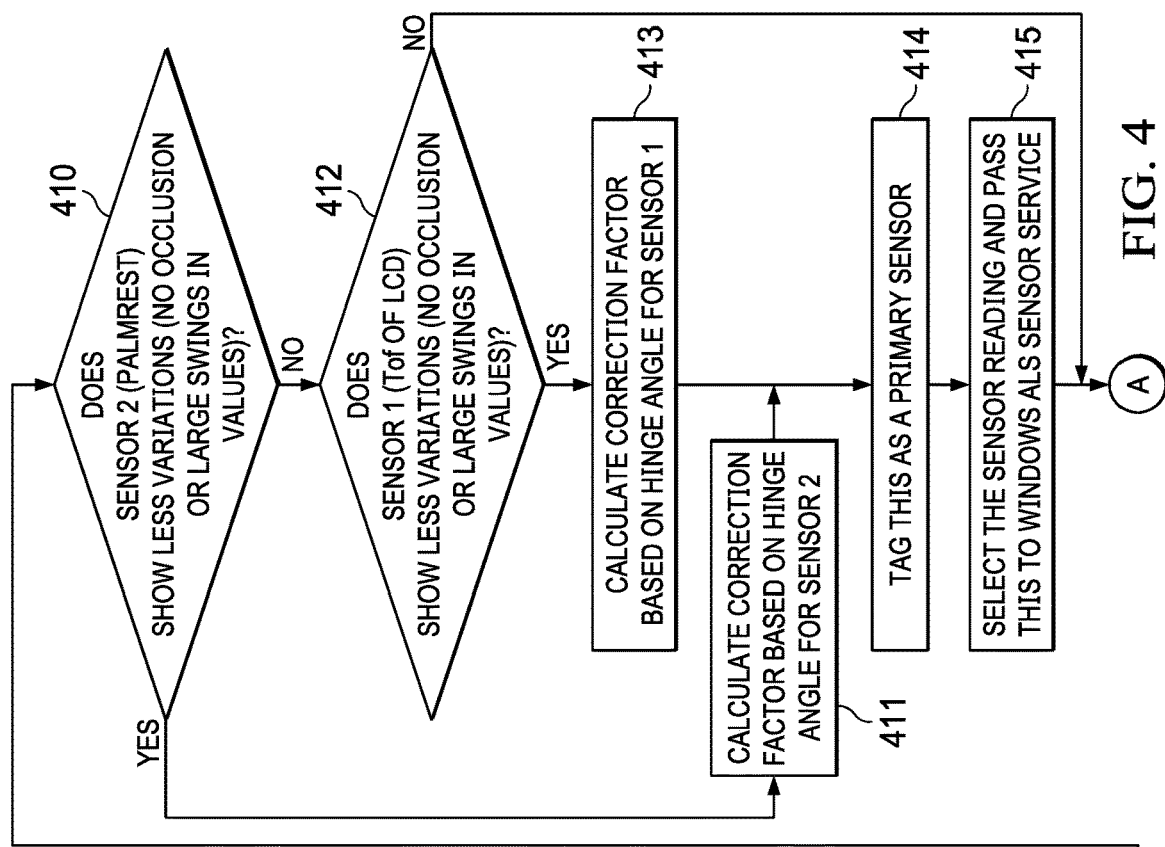
FIG. 4 is a diagram illustrating an example of a method configured to use two or more XYZ sensors to control a brightness of a display, according to some embodiments.
Figure 4:
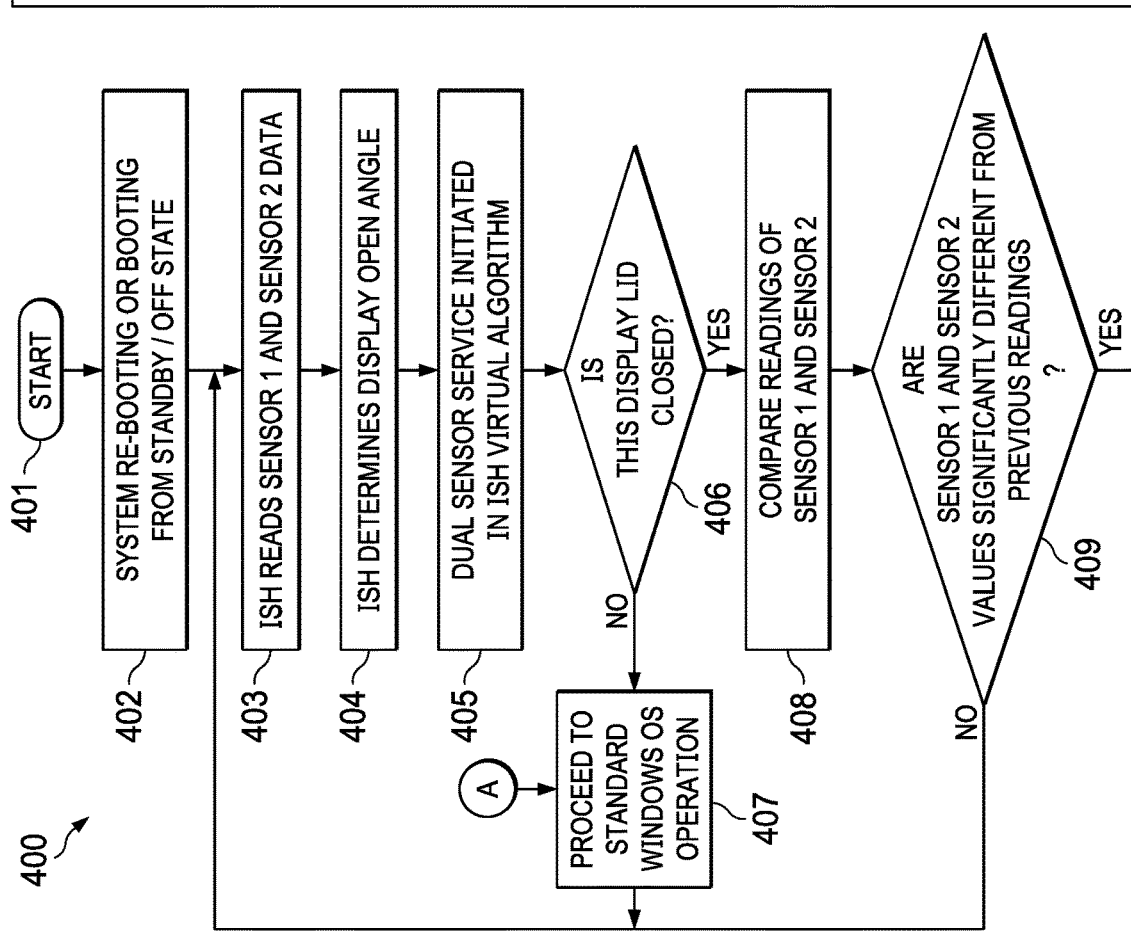

FIG. 4 is a diagram illustrating an example of method 400 configured to use two or more XYZ sensors to control a brightness of a display. In some embodiments, method 400 may be performed by the execution of software system 300 in FIG. 3. As shown, method 400 starts at block 401. At block 402, IHS 100 may re-boot or boot from a standby or off state. At block 403, ISH 114 reads data from XYZ sensors 112A and 112B. At block 404, method ISH 114 determines an angle of the open displays—that is, an angle of hinge 201. At block 405, a dual sensor service is initiated by ISH's module 303.

Block 406 determines whether the display lid is closed (that is, the hinge angle is zero). If not, control passes to block 407 where method 400 proceeds to the standard OS operation. If the lid is closed, however, block 408 compares the readings from XYZ sensors 112A and 112B.

At block 409, if XYZ sensors 112A and 112B's values are different from previous readings by an amount lesser than a threshold value, control returns to block 403. Conversely, if XYZ sensors 112A and 112B's values are equal to or greater than previous readings by an amount lesser than a threshold value, control passes to block 410.

At block 410, method 400 determines whether XYZ sensor 112B (e.g., deployed in an IHSs palm rest) shows less variation than XYZ sensor 112A. If so, block 411 calculates a correction factor (e.g., empirically determined, using an equation or lookup table, etc.) based upon a combination of any context information described above (e.g. a hinge angle) for XYZ sensor 112B. If not, at block 412, method 400 determines whether XYZ sensor 112A (e.g., deployed in an IHSs LCD) shows less variation than XYZ sensor 112B.

If the answer to block 412 is no, control returns to block 407. If the answer is yes, block 413 calculates a different correction factor or value (e.g., empirically determined, using an equation or lookup table, etc.) based upon a combination of any suitable context information described above (e.g. a hinge angle) for XYZ sensor 112A. At block 414, method 414 tags a corresponding one of XYZ sensors 112A and 112B as a primary sensor, and block 415 passes the reading from the primary sensor to an OS service before control returns to block 407.

Figure 5:
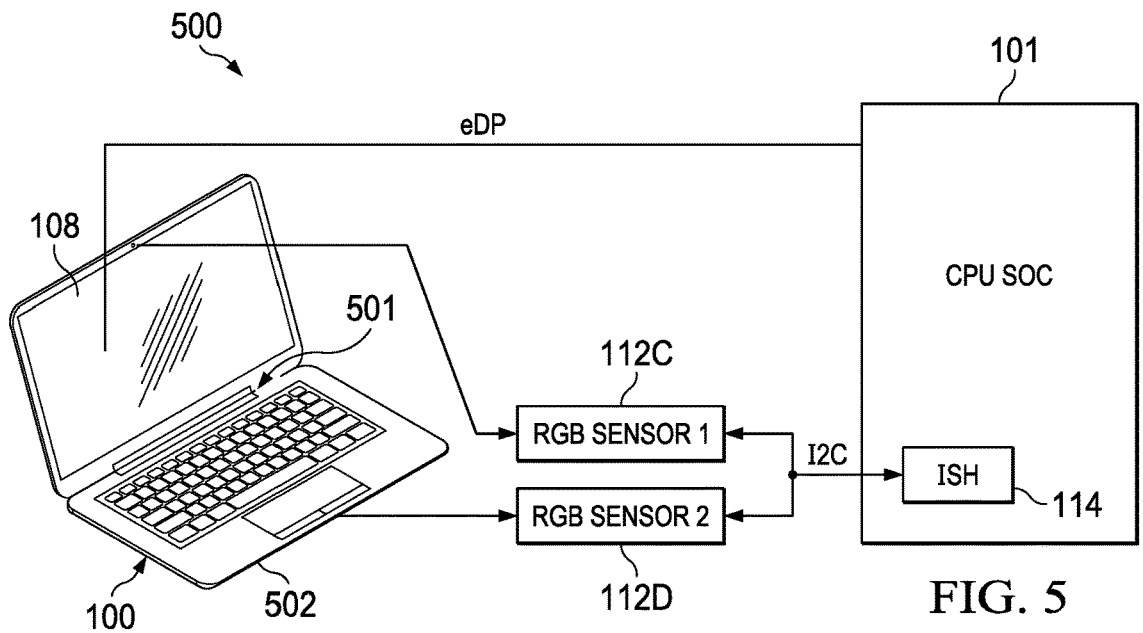
FIG. 5 is a diagram illustrating an example of a hardware system configured to use two or more RGB sensors to correct the white point of a display, according to some embodiments.

FIG. 5 is a diagram illustrating an example of hardware system 500 configured to use two or more RGB sensors to correct the white point of a display. Particularly, system 500 includes ISH 114 coupled or integrated into CPU 101 and configured to receive, via an I2C bus, ambient light measurement information from RGB sensor 112C and RGB sensor 112D. RGB sensor 112C is coupled or integrated into display 108, which is in communication with processor 101 via an eDP bus. RGB sensor 112D is coupled or integrated into keyboard or palmrest 502. Display 108 and keyboard/palmrest portion 502 are coupled to each other via hinge 502. Moreover, RGB sensors 112C and 112D are coupled to ISH 114 via I2C bus, or the like.

Figure 6:
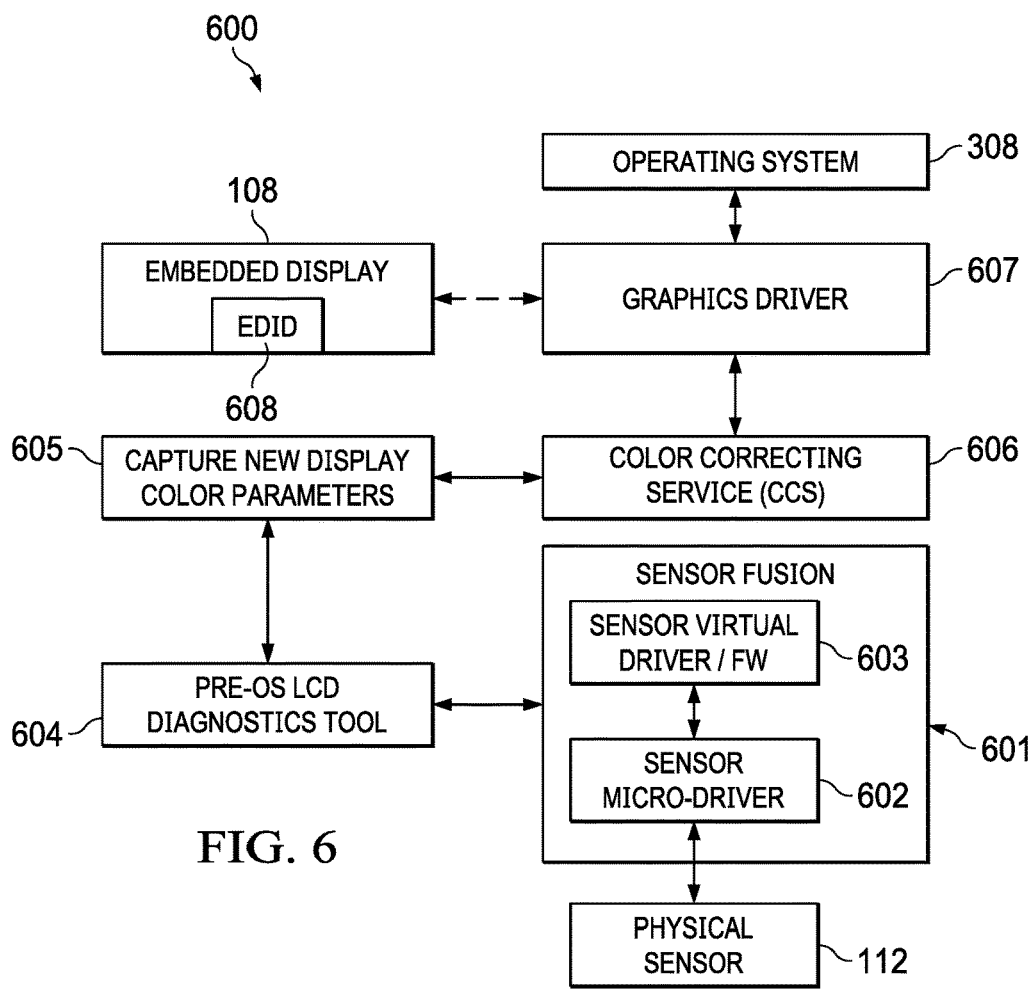
FIG. 6 is a diagram illustrating an example of a software system configured to use two or more RGB sensors to correct the white point of a display, according to some embodiments.

FIG. 6 is a diagram illustrating an example of software system 600 configured to use two or more RGB sensors to correct the white point of a display. In some cases, system 600 may be provided through the execution of program instructions stored in system memory 105 by processor 101 in cooperation with other hardware components of IHS 100, such as graphics processor 107, display(s) 108/113, sensor hub 114 (e.g., configured to perform sensor fusion operations), and sensors 112 (e.g., two or more ALS sensors, a hinge angle sensor, etc.), as also shown in system 200 of FIG. 2.

Sensor fusion firmware 601 is executed by ISH 114 and OS 308 and CCS 606 305 are executed by processor 101. Sensor fusion algorithm 601 i configured to receive sensor data from sensor microdriver(s) 602, which are configured to receive sensor measurement data from hardware sensors 112, including RGB sensors 112C and 112D.

Pre-OS diagnostics tool 604 receives data from firmware driver 601, and module 605 captures new display color parameters from tool 604. CCS 606 receives the new display color parameters from module 605 and executes method 700 described below. For example, CCS 606 may provide updated color/white point values to graphics driver 607, and/or it may store those values in EDID memory 608 of embedded display 108.

FIG. 7 is a diagram illustrating an example of method 700 configured to use two or more RGB sensors to correct the white point of a display. In some embodiments, method 700 may be performed by the execution of software system 600 in FIG. 6. As shown, method 700 starts at block 701. At block 702, IHS 100 may re-boot or boot from a standby or off state. At block 703, method 700 determines a count of boots or time since the last calibration procedure was performed. At block 704, if the calibration count has not yet been reached, control passes to block 708. At block 705, if the display lid is not closed, control also passes to block 708. At block 708, method 700 proceeds to a standard OS session.

If the count has been reached at block 704 and the lid is closed at block 705, then block 706 enables a display calibration service as part of pre-boot diagnostics. At block 707, RGB sensor 112D disposed on keyboard or palmrest portion 502 is enabled. At block 709, method 700 runs or renders pre-determined image patterns on screen 108. At block 710, ISH 114 reads and passes sensor data to pre-boot diagnostics.

At block 711, CCS 606 stores new color parameter values. At block 712, CCS 606 compares new color parameters with existing EDID information. Block 713 determines whether these values are different by amount(s) equal to or greater than a threshold(s). In some cases, these threshold value(s) may be selected based upon a combination of any suitable context information described above (e.g. a hinge angle). If not, control returns to block 708. If so, clock 714 determines whether IHS 100 is ready to reboot or to into modern standby. If not, block 715 stores EDID values in NVRAM 608 for future reboot. If so, control passes to block 716.

At block 716, CCS 606 calls an OS's graphics driver/video BIOS to write EDID values in memory 608. At block 717, method 700 updates EDID LUT values in embedded display 108. Then, at block 718, method 700 reboots IHS 100 and control returns to block 702.

In some cases, whether or not both ALS sensors in methods 400 and/or 700 are used may be triggered by a user-selectable combination of any context information described above. For example, in some cases, methods 400 and/or 700 may performed under certain conditions (e.g., user is in the near-field of IHS 100, a gaze vector indicates the user is looking at display(s) 108, etc.), while single-ALS adjustment techniques may be used in other contexts.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive a first measurement from a first Ambient Light Sensor (ALS) disposed on a display portion of the IHS;
receive a second measurement from a second ALS, wherein the second ALS is configured to face the display portion in response to IHS being in a closed posture;
determine if the first measurement and the second measurement are different from previous measurements by an amount greater than a threshold value;
in response to the determination, select one of the first or second ALS sensors, wherein the selected sensor presents least variation from the previous measurements;
calculate a correction factor for the selected ALS sensor using a lookup table (LUT) with color correction values and based upon context information;
tag the selected ALS sensor as the primary sensor; and
control a brightness of the display using a reading from the selected ALS sensor.

2. The IHS of claim 1, wherein the display portion comprises an Organic Light-Emitting Diode (OLED) panel.

3. The IHS of claim 1, wherein the second ALS is disposed on a palmrest of the IHS.

4. The IHS of claim 1, wherein the second ALS is disposed on a keyboard of the IHS.

5. The IHS of claim 1, wherein at least one of the first or second ALSs comprises an XYZ or RGB color sensor.

6. The IHS of claim 1, wherein the context information comprises at least one: of an identity of a user, a user's proximity to the IHS, an identity of an application currently under execution, a duration of execution of the application, or a user's gaze direction.

7. The IHS of claim 1, wherein the context information comprises an angle of a hinge coupling two portions of the IHS.

8. The IHS of claim 1, wherein the program instructions, upon execution, further cause the IHS to:
determine that the IHS is in the closed posture;
render a pre-determined image pattern on the display; and
obtain the second measurement in response to the rendering.

9. The IHS of claim 8, wherein the program instructions, upon execution, further cause the IHS to:
update the LUT based upon the second measurement; and
use the LUT to render a subsequent image on the display upon reboot of the IHS.

10. A memory storage device having program instructions stored thereon that, upon execution by one or more processors of an Information Handling System (IHS), cause the IHS to:
receive a first measurement from a first Ambient Light Sensor (ALS) disposed on a display portion of the IHS;
receive a second measurement from a second ALS, wherein the second ALS is configured to face the display portion in response to IHS being in a closed posture;
determine if the first measurement and the second measurement are different from previous measurements by an amount greater than a threshold value;
in response to the determination, select one of the first or second ALS sensors, wherein the selected sensor presents least variation from the previous measurements;
calculate a correction factor for the selected ALS sensor using a lookup table (LUT) with color correction values and based upon context information;
tag the selected ALS sensor as the primary sensor; and
control a brightness of the display using a reading from the selected ALS sensor.

11. The memory storage device of claim 10, wherein the context information comprises an angle of a hinge coupling two portions of the IHS.

12. The memory storage device of claim 10, wherein the program instructions, upon execution, further cause the IHS to:
determine that the IHS is in the closed posture;
render a pre-determined image pattern on the display; and
obtain the second measurement in response to the rendering.

13. The memory storage device of claim 12, wherein the program instructions, upon execution, further cause the IHS to:
update the LUT based upon the second measurement; and
use the LUT to render a subsequent image on the display upon reboot of the IHS.

14. A method, comprising:

receiving a first measurement from a first Ambient Light Sensor (ALS) disposed on a display portion of an Information Handling System (IHS);

receiving a second measurement from a second ALS, wherein the second ALS is configured to face the display portion in response to IHS being in a closed posture;

determining if the first measurement and the second measurement are different from previous measurements by an amount greater than a threshold value;

in response to the determination, selecting one of the first or second ALS sensors, wherein the selected sensor presents least variation from the previous measurements;

calculating a correction factor for the selected ALS sensor using a lookup table (LUT) with color correction values and based upon context information;

tagging the selected ALS sensor as the primary sensor; and controlling a brightness of the display using a reading from the selected ALS sensor.

15. The method of claim 14, wherein the context information comprises an angle of a hinge coupling two portions of the IHS.

16. The method of claim 14, further comprising:

determining that the IHS is in the closed posture;

rendering a pre-determined image pattern on the display; and obtaining the second measurement in response to the rendering.

17. The method of claim 16, further comprising:

updating the LUT based upon the second measurement; and using the LUT to render a subsequent image on the display upon reboot of the IHS.

* * * * *